United States Patent

[11] 3,612,572

| [72] | Inventor | John E. Raidel<br>Springfield, Mo. |
|---|---|---|
| [21] | Appl. No. | 858,732 |
| [22] | Filed | Sept. 17, 1969 |
| [45] | Patented | Oct. 12, 1971 |
| [73] | Assignee | Ridewell Corporation<br>Springfield, Mo. |

[54] AIRLIFT SUSPENSION ASSEMBLY
7 Claims, 8 Drawing Figs.

[52] U.S. Cl. .................................................... 280/124,
180/22, 267/19
[51] Int. Cl. .................................................... B60g 9/02
[50] Field of Search .................................................... 280/124,
124 F; 180/22, 22 D, 22 E; 267/18, 19, 54, 54 S

[56] References Cited
UNITED STATES PATENTS

| 3,233,915 | 2/1966 | Hamlet | 267/18 X |
| 3,390,895 | 7/1968 | Verdi | 280/124 |
| 3,494,609 | 2/1970 | Harbers, Jr. | 280/124 X |
| 3,499,660 | 3/1970 | Raidel | 280/124 X |
| 3,510,149 | 5/1970 | Raidel | 267/54 X |

*Primary Examiner*—Milton Buchler
*Assistant Examiner*—C. A. Rutledge
*Attorney*—Kingsland, Rogers, Ezell, Eilers and Robbins ABSTRACT: A vehicle suspension assembly designed to support a vehicle axle assembly and cushion and dampen shock when the axle moves either upward or downward of its normal position, and adjustable for different positions of the vehicle axle. The damping is provided by a pair of opposed air springs. The adjustability is provided by a mount that supports one end of the suspension assembly and is slidable on a hanger assembly to adjust the position of the suspension assembly. Also certain parts of the suspension assembly are invertible for accommodating substantial variations in axle location. Adjustable eccentrics in the slidable mount permit alignment of the axle.

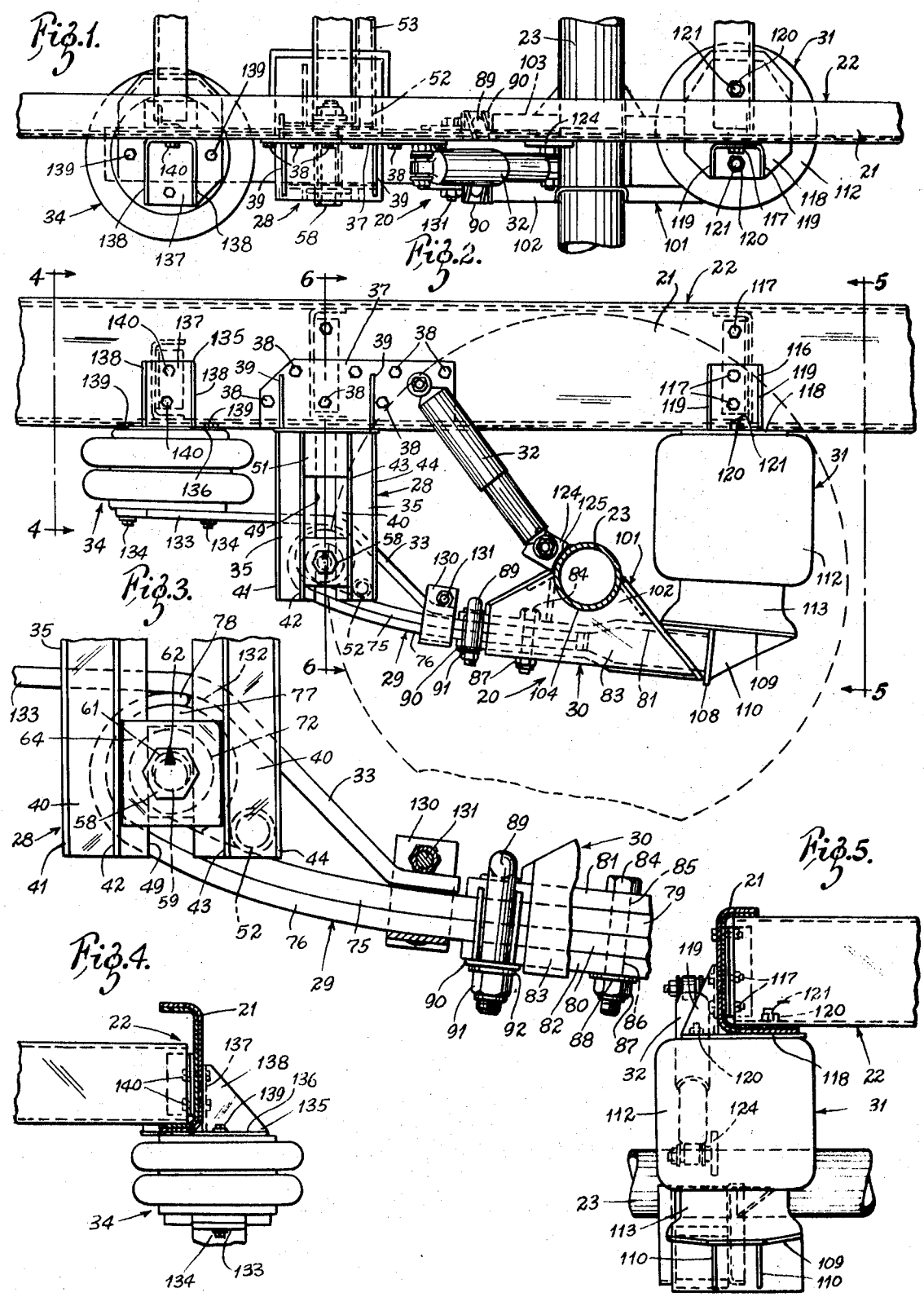

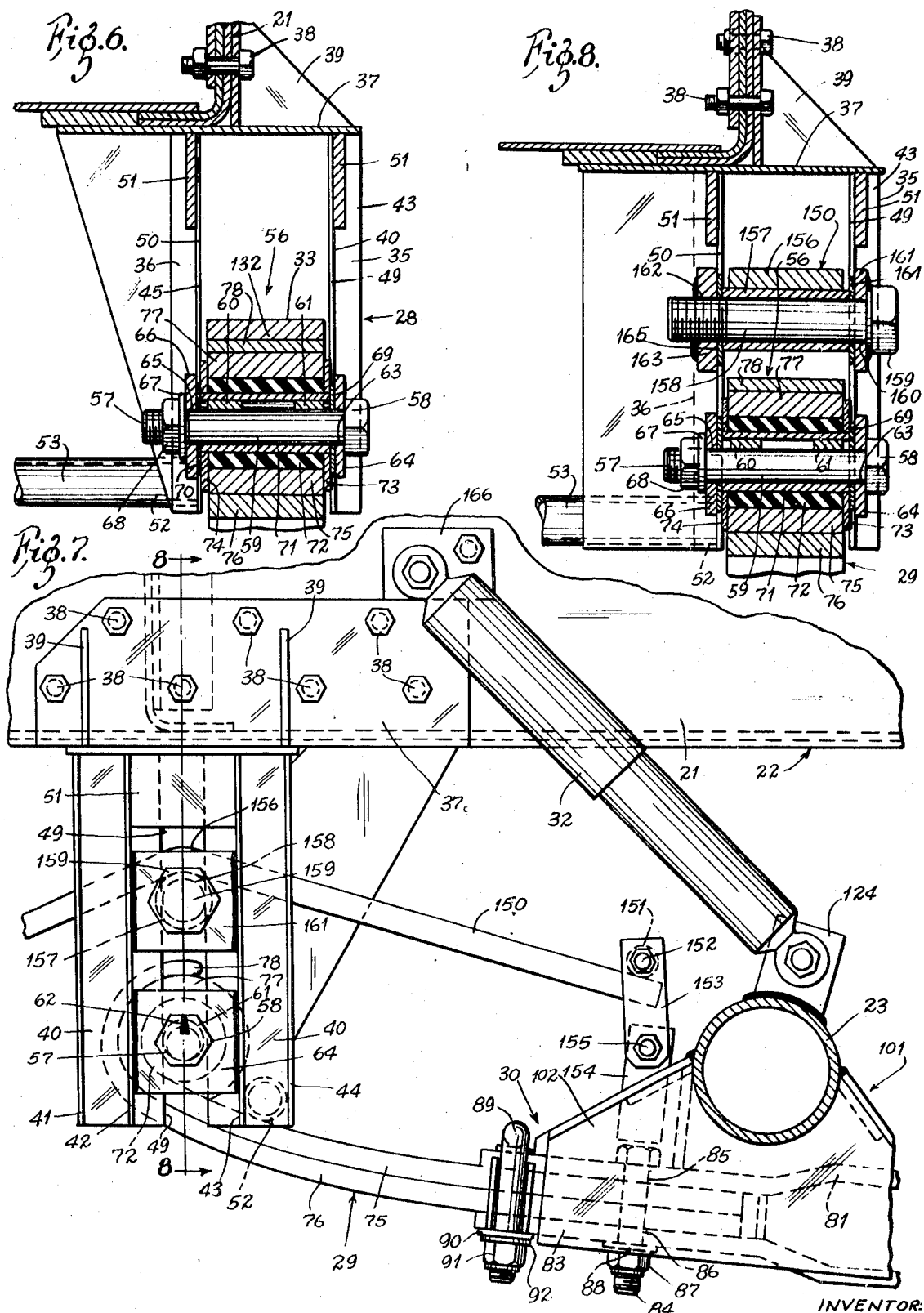

AIRLIFT SUSPENSION ASSEMBLY

BRIEF DESCRIPTION OF THE INVENTION

The suspension assembly of this invention is designed to support a vehicle axle and cushion and dampen the shock forces. The purpose of this suspension assembly is to dampen axle movement in both the upward and downward directions, and make it possible to use the same basic components for any given mounting height and for axle-underslung and axle-overslung applications, thereby eliminating the multiplicity of parts inventory required in conventional suspension designs. The suspension assembly comprises relatively few parts with reversible connections for relatively large variations in axle location and with an adjustable mount for smaller variations in axle location.

The suspension assembly includes a generally vertical hanger suspended from the vehicle chassis with a bushing mount that can be locked at a selected position on the hanger according to small variations in location of the axle. An end of a torque spring is journaled about the bushing assembly, the other end of the torque spring being connected to a beam assembly that is joined to the axle and that is also connected to a spring, such as an air spring, the other end of which is connected to the vehicle chassis. A lift-bar assembly is pivoted at the bushing mount with one end connected to the torque spring and the other to one end of a spring such as an air spring, the other end of which is connected to the vehicle chassis. For large variations in location of the axle, the beam assembly can be inverted. Also, the bushing mount comprises an eccentric cam support that can be rotated for alignment of the axle.

BRIEF DESCRIPTION OF THE DRAWINGS

FIG. 1 is a top plan view of the airlift suspension assembly;

FIG. 2 is a side elevation view of the airlift suspension assembly;

FIG. 3 is an enlarged fragmentary view of the bushing mount and torque spring assemblies;

FIG. 4 is a fragmentary view in section taken along the line 4—4 of FIG. 2;

FIG. 5 is a view in section taken along the line 5—5 of FIG. 2;

FIG. 6 is an enlarged fragmentary view in section taken along the line 6—6 of FIG. 2;

FIG. 7 is an enlarged fragmentary view showing another embodiment of the invention of FIGS. 2 and 3; and FIG. 8 is a fragmentary view in section taken along the line 8—8 of FIG. 7.

DETAILED DESCRIPTION OF THE INVENTION

As shown in FIGS. 1 and 2, the airlift suspension assembly 20 is mounted to the side member 21 of a vehicle chassis 22. Two such assemblies are provided per axle, one at each side of the vehicle chassis. Each is identical to the other except they are oppositely assembled for left and right side mounting; therefore, the details of only the left side airlift suspension assembly 20 are shown. The axle 23 of the vehicle is located below the chassis 22 by a distance that may vary.

The airlift suspension assembly's principal components comprise a hanger assembly 28, a torque spring assembly 29, and a beam assembly 30. The torque spring assembly 29 is connected between the hanger assembly 28 and the beam assembly 30. The beam assembly 30 is connected to the vehicle axle 23. The principal components also include an air spring assembly 31 of conventional design connected between the vehicle chassis 22 and the beam assembly 30, a shock absorber 32, also of conventional design, connected between the vehicle chassis 22 and the axle 23, and a lift bar 33 pivoted at the hanger assembly 28 and connected at one end to the torque spring assembly 29 and at the other end to an air spring assembly 34 of conventional design. The air spring assembly 34 is connected between the vehicle chassis 22 and the lift bar 33.

The hanger assembly 28 comprises a pair of extruded hanger rails 35 and 36 (FIGS. 6 and 8), the upper ends of which are welded to a hanger bracket 37. The bracket 37 is fastened by a plurality of bolts 38 to the chassis side member 21 and is suitable reinforced with gusset plates 39.

The hanger rail 35 is formed with a faceplate 40 and outwardly facing parallel vertical webs 41, 42, 43 and 44. Similarly, as shown in FIG. 6, the hanger rail 36 has a faceplate 45 with inwardly facing vertical webs similar to those of the hanger rail 35. The faceplates 40 and 45 have central slots 49 and 50, respectively, extending their full heights, with plates 51 welded across the upper portions of the slots 49 and 50. One end 52 of a pipe brace 53 is welded to the faceplate 45 between the webs on the face plate 45 in line with the webs 43 and 44 of the faceplate 40. The other end of the pipe brace 53 is welded to the opposing corresponding hanger rail of the right air suspension assembly (not shown).

A bushing assembly 56 is mounted between the hanger rails 35 and 36. The bushing assembly 56, as shown in FIG. 6, comprises a capscrew or bolt 57 having a head 58 and a shank 59 with a pair of cam members 60 and 61 welded to the shank 59 and projecting to one side. The cam members 60 and 61 act as eccentrics. An arrow 62 is drawn or stamped in the face of bolt head 58 and points to the central high rise of the cam eccentrics 60 and 61. The shank 59 of bolt 57 extends through a hole 63 in a plate 64 positioned between the webs 42 and 43 and bearing against the faceplate 40. The shank 59 extends within the slots 49 and 50 and through a hole 65 in a plate 66 positioned between the webs in the plate 66 in line with the webs 42 and 43 on the faceplate 40, and bearing against the faceplate 45. A lock washer 67 and a nut 68 are used to tighten the bolt 57 in place. Once the location of the plates 64 and 66 has been selected, as will be described hereinafter, they are welded in place. A pair of narrower plates 69 and 70 are welded to the inner faces of the plates 64 and 66 and ride within the slots 49 and 50 of the hangers 35 and 36. A metal sleeve 71 surrounds the shank 59 and the cam eccentrics of the bolt 57, and a rubber bushing 72 surrounds the sleeve 71. There are washers 73 and 74 at each end of the rubber bushing 72.

The torque spring 29 comprises a pair of spring members 75 and 76 welded together. An end 77 of the upper spring member 75 is wound about the rubber bushing 72. An end 78 of the other spring member 76 is partially wound about the end 77 of the spring member 75.

The other ends 79 and 80 of the spring members 75 and 76 are positioned between the top 81 and bottom 82 of a beam member 83, the beam member 83 being part of the beam assembly 30. A bolt 84 extends through holes 85 and 86 in the top and bottom walls 81 and 82 of the beam member 83 and also extends through appropriate holes in the spring members 75 and 76, all as shown in FIG. 3. The bolt 84 is fastened in place by a nut 87 and lock washer 88. The spring members 75 and 76 are also further locked in place by a U-bolt 89 extending around the top and sides of the beam member 83 and through holes in a plate 90. Nuts 91 and lock washers 92 complete the U-bolt assembly, locking the torque spring 29 to the beam 83.

The beam assembly 30 also includes an axle support 101 comprised of two opposed flanged triangular plates 102 and 103 having curved slots 104 within which the axle 23 is mounted and welded.

A vertical end plate 108 is welded to the end of the beam 83. An air spring mounting plate 109 is welded to the top 81 of the beam 83, extending beyond the end of the beam. A reinforcing gusset plate 110 is welded to the end plate 108 and the extending portion of the air spring mounting plate 109.

The air spring 31 is of conventional design, having an air spring body 112 above a base 113. The base 113 is mounted by conventional means to the air spring mounting plate 109. An upper mounting bracket 116 is fastened by bolts 117 to the side member 21 of the truck chassis. The bracket 116 includes a horizontal plate 118 and reinforcing gussets 119. The upper side of the air spring body 112 is fastened to the plate 118 by nuts 120 threaded onto studs 121 (FIG. 5).

The shock absorber 32 is standard. It is mounted by conventional means between a bottom mounting bracket 124 which has a curved edge 125 conforming to the radius of curvature of the axle 23, and which is welded to the axle 23 along the curved edge 125 as shown in FIG. 2, and the hanger bracket 37. The location of the shock absorber 32 may be changed as required or desired for purposes known in the art.

The lift bar 33 is connected at one end to the torque spring assembly 29 by any conventional means such as the clamp 130 and the bolt 131 in FIGS. 2 and 3. The lift bar 33 has a bend 132 where it rests on the end 78 of the spring member 76 and has a substantially horizontal portion 133 extending beyond the spring end 78. An air spring 34 of conventional design has its lower end secured to the horizontal portion 133 of the lift bar 33 with bolts 134. The upper end of the air spring 34 is secured to the side member 21 of the truck chassis by an upper mounting bracket 135. The bracket 135 includes a horizontal plate 136, a vertical plate 137, and reinforcing gussets 138. The upper end of the air spring 34 is fastened to the horizontal plate 136 by studs 139 (FIG. 4). The vertical plate 137 is fastened to the side member 21 of the truck chassis by nut and bolt assemblies 140.

FIGS. 7 and 8 show another important embodiment of the invention which is similar to the embodiment described above except for the way the lift bar is connected at its axle end and how it is pivoted. Unlike the embodiment described above, a lift bar 150 has one end resting against the under side of a sleeve 151 surrounding a bolt shank 152 which extends through holes in a bracket 153. The bracket 153 is fastened to another bracket 154 by a bolt 155. The bracket 154 is welded to the triangle plates 102 and 103 of the axle support 101 above the bolt 84. Also, unlike the embodiment described above, the lift bar 150 has a bend 156 where it rests on a metal sleeve 157 surrounding the shank 158 of a bolt 159. The shank 158 extends through a hole 160 in a plate 161 which bears against the faceplate 40. The shank 158 extends within the slots 49 and 50 and through a threaded hole 162 in a plate 163 which bears against the faceplate 45. Once the location of the plates 161 and 163 has been selected, they are welded in place.

A pair of narrower plates 164 and 165 are welded to the inner faces of the plates 161 and 163 and ride within the slots 49 and 50 of the hangers 35 and 36. As shown in FIGS. 7 and 8, the bolt 159 is positioned above the bolt 57 along the slots 49 and 50 of the hangers 35 and 36. The other end of the lift bar 150 is fastened to an air spring as in the first described embodiment of the invention.

Where the second described embodiment is used, it is necessary to slightly change the mounting position of the shock absorber 32 to allow room for the brackets 153 and 154. Thus as shown in FIG. 7, the bottom mounting bracket 124 of the shock absorber 32 is welded to the axle 23 just past the top of the axle 23, and the other end of the shock absorber 32 is mounted higher on the side member 21 of the truck chassis with an upper mounting bracket 166.

Both of the embodiments of the invention described above are easily adaptable to accommodate an axle mounting in the axle-underslung position, that is, where the axle is positioned beneath the beam assembly 30, as well as the axle-overslung position as shown in the drawings. For a description of how the axle-underslung position is accomplished with much the same parts used in the axle-overslung position see my U.S. Pat. No. 3,510,149 entitled "Adjustable Air Suspension."

INSTALLATION AND OPERATION

The beam 83 and the axle support 101 are oriented as shown in FIGS. 2 and 7, and the beam 83 is connected to the torque spring 29 by the bolt 84 and the U-bolt 89, and the axle support 101 is welded to the axle 23. With the air spring 31 connected to the bracket 116 and suspended from the chassis 22, the beam 83 is bolted to the base 113 of the air spring 31.

When the bushing assembly 56 has been assembled, and with the spring ends 77 and 78 wrapped about the rubber bushing 72, the bushing assembly 56 is adjusted vertically relative to the hanger assembly 28 until the desired elevation of the axle 23 is reached. Then the nut 68 is tightened against the lock washer 67, and the plates 64 and 66 are spot-welded in place. The bushing assembly 56 thus provides relatively fine adjustment of the elevation of the axle 23.

The bushing assembly 56 permits alignment of the axle 23 upon completion of the before-described installation. When the axle position has been determined and the plates 64 and 66 spot-welded to the hangers 35 and 36, the nut 68 can be loosened and the bolt 57 can be rotated. Rotation of the bolt 57 in the bushing assembly on either side of the vehicle permits accurate alignment of the axle 23, because as the bolt 57 is rotated, the cam eccentrics 60 and 61 change the location of the bushing 72, and therefore the location of the torque spring 29. The amount of change that can be produced by rotation of the bolt 151 is adequate to enable accurate alignment of the axle 23. When the proper alignment has been achieved, the nut 68 is again tightened against the lockwasher.

Referring to the first described embodiment of the invention, the lift bar 33 is placed over the bushing assembly 56 with its bend 132 resting on end 78 of the spring member 76. With the air spring 34 connected to the bracket 135 and suspended from the chassis 22, one end of the lift bar 33 is then clamped to the torque spring 29 and the other end bolted to the base of the air spring 34.

Referring to the second described embodiment of the invention, the bracket 154 is welded in place with the bracket 153 bolted thereto (FIG. 7). The bolt assembly 159 is assembled and positioned in place above the bushing assembly 56 with the air spring 34 connected to the bracket 135 and suspended from the chassis 22. The lift bar 150 is positioned over the bolt assembly 159 with one end resting under the sleeve 151 of the bracket 153. The other end is bolted to the base of the air spring 34. The bolt assembly 159 is then adjusted vertically with respect to the hanger assembly 28 until it contact the lift bar 150 at the bend 156. The bolt 159 is then tightened and the plates 161 and 163 welded in place.

In any installation of the suspension assembly of this invention, the air springs 31 and 34, the torque spring, and the shock absorber isolate shock forces. When the axle moves in the upward direction, such as when the wheel hits a bump in the road, the air spring 31, the torque spring, and the shock absorber act to dampen the axle movement. When the axle moves in a downward direction, such as when the wheel falls into a hole in the road, the air spring 34, the torque spring and the shock absorber act to dampen the axle movement. Hence, the invention provides an adjustable suspension assembly that can accommodate varying heights of axle location with provisions for aligning the axle with relatively few parts that are easy to assemble and are interchangeable for the different axle locations, and that dampens axle movement in both the upward and downward directions.

What is claimed is:

1. A vehicle suspension assembly for dampening axle movement comprising a leaf spring, means for connecting one end of the leaf spring to the axle, means for supporting the other end of the leaf spring from the vehicle chassis, a first air spring, means connecting the first air spring between the chassis and the leaf spring, a lift bar, means for connecting one end of the lift bar to the leaf spring between the axle and the support means, means supported from the chassis for providing a fulcrum for the lift bar intermediate its ends, a second air spring, and means connecting the second air spring between the other end of the lift bar and the chassis, whereby axle movement in the upward direction will be resisted by the first air spring, and axle movement in the downward direction will cause the lift bar to pivot about the fulcrum and be resisted by the second air spring.

2. The vehicle suspension assembly of claim 1 wherein the means to support the other end of the leaf spring to the vehicle chassis and the fulcrum means comprise a hanger support adapted to be suspended from the vehicle chassis, a bearing, means for locking the bearing to the hanger support in a selected position, means for journaling the one end of the leaf spring to the bearing with the end of the leaf spring journaled thereto providing the fulcrum for the lift bar.

3. The vehicle suspension assembly of claim 2 wherein the means for connecting one end of the lift bar to the leaf spring comprises a bracket connected to the leaf spring between the axle and the support means, a bolt locked in the upper portion of the bracket, the end of the lift bar resting on the underside of the bolt.

4. The vehicle suspension assembly of claim 2 including means for adjusting the vertical position of the bearing relative to the hanger support to accommodate variations in axle spacing from the vehicle chassis.

5. The vehicle suspension assembly of claim 2 wherein the hanger support comprises a pair of spaced slotted plates, and the bearing includes an eccentric rotatably mounted between the two plates to enable fine adjustment of the bearing.

6. The vehicle suspension assembly of claim 1 wherein the means to support the other end of the leaf spring to the vehicle chassis comprises a hanger support adapted to be suspended from the vehicle chassis, a bearing, means for locking the bearing to the hanger support in a selected position, means for journaling the one end of the leaf spring to the bearing, and the fulcrum means comprising a bolt locked to the hanger in a selected position above the bearing.

7. A vehicle suspension assembly for dampening axle movement comprising a leaf spring, means for connecting one end of the leaf spring to the axle, means for supporting the other end of the leaf spring from the vehicle chassis, first compression spring means connected between the leaf spring and the chassis which resist axle movement in the upward direction, and second compression spring means connected between the leaf spring and the chassis which resists axle movement in the downward direction, and a beam, means for releasably connecting the beam to the axle, the first compression spring means being connected between one end of the beam and the chassis for resisting axle movement in the upward direction, and means for connecting the other end of the beam to the axle end of the leaf spring in either of two inverted orientations to accommodate different positions of the axle relative to the chassis.